Oct. 21, 1969    TOSHIHIRO KAGAWA    3,474,096

PROCESS OF PRODUCING TRICHLOROCYANURIC ACID

Filed Jan. 3, 1967    2 Sheets-Sheet 1

Toshihiro Kagawa
INVENTOR.

United States Patent Office 3,474,096
Patented Oct. 21, 1969

3,474,096
PROCESS OF PRODUCING TRICHLORO-
CYANURIC ACID
Toshihiro Kagawa, Ayauta-cho, Ayauta-gun, Kagawa-ken,
Japan, assignor to Shikoku Kasei Kogyo Company,
Limited, Kagawa-ken, Japan
Filed Jan. 3, 1967, Ser. No. 606,835
Int. Cl. C07d 55/36
U.S. Cl. 260—248                                6 Claims

ABSTRACT OF THE DISCLOSURE

A process for producing trichlorocyanuric acid by chlorinating cyanuric acid with gaseous chlorine in the presence of first and second alkaline agents. The first alkaline agent is an alkali metal hydroxide or carbonate and the second alkaline agent is an alkaline earth metal or zinc hydroxide carbonate or oxide.

---

This invention relates to a process of producing trichlorocyanuric acid, and more particularly to a process of producing highly pure trichlorocyanuric acid, in excellent yield. The process is industrially safe and easily overcomes various disadvantageous subsidiary reactions.

Heretofore, various processes of producing trichlorocyanuric acid by the chlorination of cyanuric acid have been proposed and carried into effect. Among them, there is a process in which a mixture of cyanuric acid and an aqueous solution of an alkali metal hydroxide or oxide is converted by chlorination into trichlorocyanuric acid by passing gaseous chlorine there through while maintaining the pH value of the mixture less a certain point. Further there is a process in which a slurry of cyanuric acid is converted by chlorination into a slurry of trichlorocynauric acid by passing gaseous chlorine therethrough while maintaining the pH value of the slurry at a constant value, the trichlorocyanuric acid being then separated from the slurry by filtration, centrifugal separation, decantation, or the like.

However, in these processes, nitrogen trichloride $NCl_3$ is formed during the process, which compound is extremely unstable so that there are disadvantages present such as, that in spite of the requirement of complicated operation apparatus, there is the probability of a dangerous explosion and it is impossible to produce trichloro cyanuric acid in a high yield.

There is also known a process of producing trichlorocynauric acid which has become the standard process therefor. In this process, elementary chlorine is passed through a solution containing a tri-alkali metal cyanurate obtained by dissolving cyanuric acid in an aqueous solution of a caustic alkali, the latter being used in a molar amount of three times with respect to the former. This process is not preferable as an industrial process for producing trichlorocyanuric acid for the reason that dangerous $NCl_3$ is formed by a subsidiary reaction which accompanies the main reaction and thus the yield of the main product is poor.

In accordance with our study, the quantity of $NCl_3$ thus formed is more than 9.6 g. per mol of cyanuric acid when caustic soda is employed as the caustic alkali, so that there is the probability of a dangerous explosion and the yield of trichlorocyanuric acid is only 75% based on the cyanuric acid used.

There is a tendency for much of the caustic soda to be consumed for the subsidiary reaction of forming $NCl_3$ so that the effective amount of chlorine becomes low even if 3 mols of caustic soda are employed per mol of cyanuric acid. If an excess of caustic soda is added in order to increase the amount of effective chlorine available for the production of trichlorocyanuric acid, the formation of $NCl_3$ becomes even greater and the dangerous probability of explosion increases while the yield of the product and utilization factor of the chlorine decreases.

The primary object of this invention is to provide a process for producing trichlorocyanuric acid with sufficient safety without the formation of $NCl_3$ beyond a certain extent.

Another object of this invention is to provide a process for producing trichlorocyanuric acid in excellent yield.

Still another object of this invention is to provide a process for producing high purity trichlorocyanuric acid.

Still another object of this invention is to provide a process for producing trichlorocyanuric acid whereby the cost of manufacturing the same is reduced.

Many experiments have been effected by us in order to achieve these objects, and which relate to neutralizing agents for the $H^+$ formed in the process of chlorination of cyanuric acid, the time and the conditions for the formation of $NCl_3$ and the like. As a result of these experiments and other studies, the following process has been invented.

In accordance with this invention, highly pure trichlorocynauric acid is safely produced by chlorinating cyanuric acid with gaseous chlorine in an aqueous medium in the presence of first and second alkaline agents. The first alkaline agent is at least one member of the group consisting of alkali metal hydroxides and carbonates and the second alkaline agent is at least one member of the group consisting of alkaline earth metal and zinc hydroxides, carbonates and oxides. The first alkaline agent is present in an amount of at most 2 mols per mol of cyanuric acid, the second alkaline agent is present in an amount of at least 0.5 mol per mol of cyanuric acid and the total molar amount of both alkaline agents is at least equal to the molar amount of cyanuric acid.

The aqueous medium in which the reaction is conducted is maintained at a temperature of 0° to 40° C. during the chlorination and the gaseous chloring is introduced until the pH of the aqueous medium becomes at most 4.0. After the trichlorocyanuric acid has been precipitated by the above process, the precipitate is separated out of the reaction mixture by filtration, centrifugal separation, etc.

Trichlorocyanuric acid is a compound in which chlorine is substituted for each of the three hydrogen atoms in cyanuric acid, as is well known. In order to complete the chlorination reaction of cyanuric acid, it is necessary therefore to neutralize the protons which are successively discharged from the cyanuric acid in accordance with progress of the chlorination reaction. It is a well known fact that, to this end, it is necessary that there be present the chemical equivalent of an alkaline substance to the three protons per mol of cyanuric acid.

The well known standardized process of producing trichlorocyanuric acid referred to above is a process in which a caustic alkali is used as the neutralizing agent for the protons. The cause of the subsidiary reaction which forms the dangerous $NCl_3$ in the process has been believed to consist mainly in a decomposition which results from the chloration of the triazine ring of cyanuric acid which occurs when the alkaline state of the reaction liquid is more than 9.0 in pH during the initial period of the chlorination reaction, as described in the Japanese patent application publication No. 23,643 of 1963 and U.S. Patent No. 2,964,525. Accordingly, heretofore, it has been considered preferable that, in order to produce trichlorocyanuric acid with safety, the feeding rates of cyanuric acid, caustic alkali, and chlorine should be respectively adjusted so that the pH value of the liquid reactant is always maintained at less than 9.0, that 3 mols of caustic alkali should be fed per mol of cyanuric acid, and that the chlorine should be fed so as to bring the pH value of the reactant liquid at the last stage of the reaction down to less than 3.5.

However, we have found that, as shown in the referential data described hereinafter and illustrated in the drawings, in the case where trichlorocyanuric acid is produced in accordance with the above-stated procedure, $NCl_3$ produced as a by-product amounted to more than 10.8 g. per mol of cyanuric acid starting material, which is even larger than 9.6 g. of $NCl_3$ per mol of cyanuric acid in the standardized process referred to above.

We have further found from many experiments that, in the process of chlorination of cyanuric acid in accordance with the standardized process, in the period during which the cyanuric acid is converted merely to dichlorocyanuric acid, the formation of $NCl_3$ is very small, that is to say, 0.4 g. per mol of cyanuric acid, while in the final period during which the intermediate dichlorocyanuric acid is converted to trichlorocyanuric acid, a large quantity, or 9.2 g. of $NCl_3$ is formed. Thus we have found that the formation of $NCl_3$ does not result from the chloration of triazine ring of cyanuric acid in the presence of an alkali in the early period of the chlorination as was generally believed heretofore, but rather results from the partial decomposition of the trichlorocyanuric acid produced in the reaction system, which is decomposed as a result of being attacked by the alkaline agent supplied for neutralization of the third proton in the last stage of the chlorinating process. This is also expected from the fact that a large quantity of $NCl_3$ is formed by adding caustic alkali to trichlorocyanuric acid so as to decompose the latter.

We have now found a more important fact. The fact is that, in chlorinating dichlorocyanuric acid to trichlorocyanuric acid, if a hydroxide, oxide or carbonate of either an alkaline earth metal such as Ca, Ba, Mg, or the like; or Zn is used as the alkaline agent required for neutralization of the proton discharged from the trichlorocyanuric acid, the formation of $NCl_3$ becomes very small. In fact, the formation is as little as 1.3 g. per mol of cyanuric acid, so that it is possible to limit the formation of $NCl_3$ to an amount such as corresponds to only 13% of the corresponding formation in the well known standardized process.

It appears that the above is due to the fact that the difference in reaction velocity between the main neutralization reaction by means of an alkaline agent comprising the hydroxide, oxide, or carbonate of an alkaline earth metal or zinc and the subsidiary reaction of decomposing the trichlorocyanuric acid is far greater than the difference in reaction velocity between the corresponding reactions when a caustic alkali is used.

Accordingly, in order to convert cyanuric acid to trichlorocyanuric acid while inhibiting the formation of $NCl_3$, it is considered that at first the cyanuric acid is chlorinated into dichlorocyanuric acid in an aqueous solution containing twice the molar quantity either of a hydroxide and/or a carbonate of an alkali metal, and then the chlorination is continued with the addition of 0.5 times the molar quantity of any of the hydroxides, oxides and/or carbonates of an alkaline earth metal or Zn. However, it is preferable to chlorinate cyanuric acid which has been dissolved or dispersed into a slurry containing both kinds of alkaline agents, i.e., the first and second alkaline agents together.

When both alkaline agents are added together it is possible to further reduce by about 0.1 to 0.3 g. per mol of cyanuric acid the formation of $NCl_3$.

The basis on which the above advantages rest are the following: When any of the hydroxides, oxides, or carbonates of an alkaline earth metal or Zn is added to the reactant liquid during the chlorination from dichlorocyanuric acid to trichlorocyanuric acid, the produced trichlorocyanuric acid is partly attached and thus decomposed by virtue of a localized elevation in concentration of the alkaline agent. On the other hand, when a slurry initially containing cyanuric acid, a hydroxide or a carbonate of an alkali metal, and a hydroxide, oxide, or carbonate of an alkaline earth metal or Zn is chlorinated, the alkali metal compound is selectively consumed for neutralizing the protons until dichlorocyanuric acid is formed, while the formation of trichlorocyanuric acid from the dichlorocyanuric acid is effected by virtue of comsumption of the alkaline earth metal compound or Zn compound. Thus, the entire quantity of the neutralizing agent is initially added so that there occurs no localized elevation in concentration of alkali as in the former case, by virtue whereof the partly formed trichlorocyanuric acid is not apt to be decomposed.

Although Canadian Patent No. 686,773 has disclosed a process for producing dichlorocyanuric acid and trichlorocyanuric acid in which a compound of an alkaline earth metal is used as the alkaline agent, there is no further improvement upon the conventional concept with regard to the $NCl_3$ formation mechanism in the process of chlorination of cyanuric acid. Accordingly, in the Canadian patent, the whole quantity of alkaline agent required for the chlorination reaction is an alkaline earth metal compound. Thus the Canadian patent differs from the present invention thoroughly. Such a process as the above Canadian patent, in which too great a quantity of an alkaline earth metal compound for preventing formation of $NCl_3$ is used, is not preferable in view of the following.

In order to clarify some disadvantages in the conventional processes for the production of trichlorocyanuric acid, such processes have been studied by us, resulting in the following referential data (experiments) which are also illustrated in the accompanying drawing, in which:

FIGS. 3 and 5 are diagrammatic views illustrating interrelations between the quantities of caustic soda used and the formations of $NCl_3$ in Experiments III and V, respectively.

Figure 1:
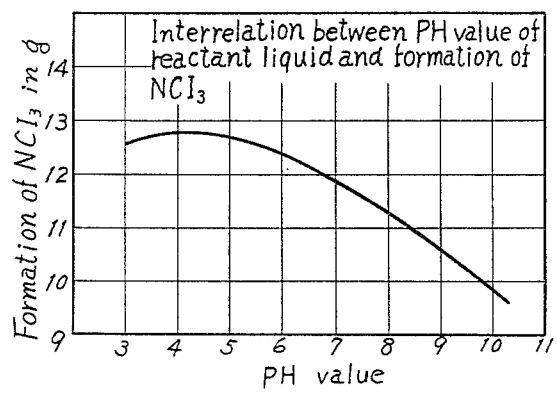
FIGS. 1 and 2 are diagrammatic views illustrating the interrelations between the pH values of reactant liquids and the formation of $NCl_3$ in the chlorination reactions of cyanuric acid described in Experiments I and II, respectively.

Referring more particularly to the drawing, the experiments carried out by us will now be described.

EXPERIMENT I

In this experiment, it was intended to demonstrate that it is impossible to inhibit the formation of $NCl_3$ in the production of trichlorocyanuric acid, even if caustic soda alone is used as the alkaline agent and the pH of the reactant liquid is maintained below 9.0 during the chlorination of cyanuric acid.

A reaction vessel having a capacity of 3 liters, made of titanium metal and equipped with a mechanical stirrer, an alkaline agent inlet, a gaseous chorine inlet, a gas outlet, a thermometer, and a pH meter was prepared. During the chlorination reaction, the reaction vessel was immersed in ice water so as to adjust the temperature of the reactants.

1.5 liters of water and 1 mol of cyanuric acid were placed in the above vessel and stirred into a slurry. Gaseous chlorine was passed into the vessel at the rate of 1 liter per minute while maintaining the slurry at a temperature of 10 to 15° C. and adding caustic soda thereto dropwise so as to maintain the slurry at a predetermined pH value which was variously selected for each case. The caustic soda was in the form of 30% aqueous solution. After 3 mols of caustic soda had been added, the addition was stopped while gaseous chlorine was steadily supplied until the pH value of the reactant liquid became 3.0 with constantly vigorous stirring. Trichlorocyanuric acid thus produced was filtered, washed with water, dried, and examined as to yield and the quantity of effective chlorine. In order to quantitatively study formation of $NCl_3$, the gaseous exhaust was introduced into an absorption bottle containing concentrated hydrochloric acid so as to quantitatively measure the $NCl_3$ in the gaseous exhaust in the form of ammonium chloride. Also samples of the reactant liquid were stirred with carbon tetrachloride so as to dissolve therein the $NCl_3$ contained in the reactant liquid in the form of ammonium chloride. The following table illustrates the results of the above experiments.

| pH value maintained: | Yield in percent based on quantities of cyanuric acid used | Effective Cl in the product in percent | Formation of $NCl_3$ in g |
|---|---|---|---|
| 10.5 | 75.6 | 90.6 | 9.52 |
| 9 | 76.0 | 91.15 | 10.8 |
| 7 | 75.7 | 88.2 | 11.65 |
| 5 | 74.5 | 89.09 | 12.8 |
| 3 | 77.0 | 88.61 | 12.5 |

FIG. 1 is a diagrammatic view showing the interrelation between the pH value of the reactant liquid and the formation of $NCl_3$ during the chlorination reaction in Experiment I.

Thus it is demonstrated that it is useless from the point of view of inhibiting the formation of $NCl_3$ to chlorinate, in accordance with the prior art, at a pH value below 9.0, because of the fact that the lower pH values maintained the greater formation of $NCl_3$.

EXPERIMENT II

This experiment was done in order to confirm the quantity of $NCl_3$ formed during the chlorination of cyanuric acid in accordance with the generally well known process for the production of trichlorocyanuric acid and also the period of such formation therein.

The same vessel as in Experiment I was used and $NCl_3$ was measured in the same manner. In 1.5 liters of water placed in the reaction vessel, 3 mols of caustic soda and 1 mol of cyanuric acid were dissolved with stirring. Gaseous chlorine was supplied to the reactant liquid obtained as above at the rate of 1 liter per minute while adjusting the temperature of the liquid at 10 to 15° C. The pH value of the reactant liquid decreased gradually in accordance with the quantity of chlorine introduced, starting from an initial value of 13.8 and the introduction of chlorine was stopped when the pH value had decreased to 3.0. During the period of the gaseous chlorine introduction, the reactant liquid was sampled several times while the pH value was varying. From each sample, the $NCl_3$ formed up to that time was measured. After the reaction had been completed, the trichlorocyanuric acid produced was treated as in Experiment I, yielding 175 g. of trichlorocyanuric acid, the weight of which was corrected to account for the samples removed during the process of the reaction. The effective chlorine in the yield was 90.35%.

Figure 2:
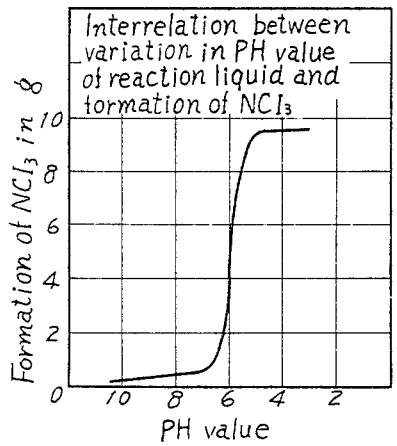

The following table and FIG. 2 show the interrelations between the formation of $NCl_3$ in grams by time and the pH value of the reactant liquid at that time.

| | pH value of reactant liquid | | | | |
|---|---|---|---|---|---|
| | 10.5 | 9 | 7 | 5 | 3 |
| Formation of $NCl_3$ in grams | 0.16 | 0.23 | 0.40 | 9.58 | 9.61 |

By virtue of this experiment, it was found that the formation of $NCl_3$ suddenly and sharply increases in the period of the latter half of the chlorination reaction when the pH value of the reactant liquid decreases to below 7.0. In addition, it was also found that the quantity of chlorine supplied to the reactant liquid by the time at which the pH value of the liquid decreased to 7.0 corresponds to two third of the quantity of chlorine required to complete the chlorination reaction. In view of this, it is supposed that, at the point at which two third of the chlorine has been consumed, cyanuric acid has been converted into dichlorocyanuric acid and thereafter, where the dichlorocyanuric acid is further converted into trichlorocyanuric acid the formation of $NCl_3$ suddenly increases.

EXPERIMENT III

This experiment was carried out in order to establish that, while during dichlorocyanuric acid formation, $NCl_3$ is scarcely formed, during the chlorination of dichlorocyanuric acid to trichlorocyanuric acid, much $NCl_3$ formation occurs.

In the same vessel as used in Experiment I, 1.5 liters of water and 1 mol of cyanuric acid were placed and stirred so as to obtain a slurry thereof and the temperature thereof was adjusted to 10 to 15° C. Gaseous chlorine was fed into the slurry at the rate of 1 liter per minute while charging caustic soda dropwise as an alkaline agent. By virtue of the chargin, the pH value of the reactant slurry was maintained at 5.0. After the predetermined quantity of caustic soda had been charged, the introduction of gaseous chlorine was continued for further chlorination during the further diminution of the pH value to 3.0. The product of the chlorination reaction was filtered, washed with water, dried, and separated. In this experiment, caustic soda was used, $NCl_3$ was formed, and effective chlorine was combined in the quantities tabulated as follows:

| Caustic soda mol | 2.0 | 2.2 | 2.4 | 2.6 | 2.8 | 3.0 | 3.2 |
|---|---|---|---|---|---|---|---|
| $NCl_3$ formed g | 0.43 | 1.45 | 2.65 | 4.4 | 7.0 | 12.8 | 18.6 |
| Effective Cl, percent | 71.5 | 75.2 | 78.7 | 82.84 | 86.5 | 90.37 | 90.5 |

From the above data, it is seen that the yield consists of dichlorocyanuric acid when 2 mols of caustic soda are used, trichlorocyanuric acid when more than 3 mols of caustic soda are used, and a mixture of dichlorocyanuric acid and trichlorocyanuric acid when a quantity between 2 and 3 mols of caustic soda is used.

Figure 3:
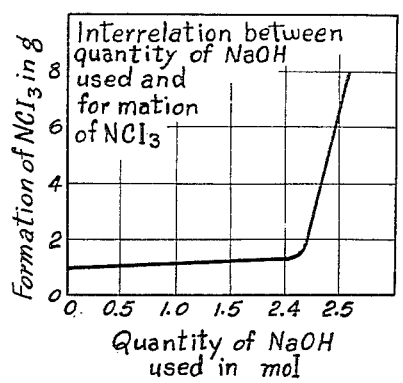
Figure 3:
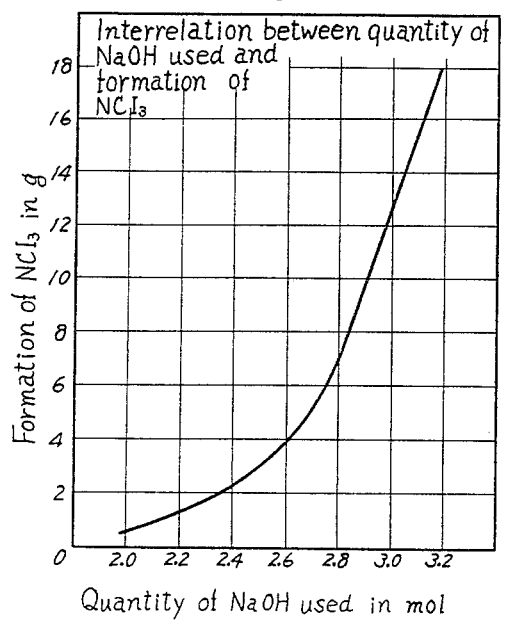

FIG. 3 illustrates the interrelation between the quantity of caustic soda used and the quantity of $NCl_3$ formed during the reaction in this experiment.

By virtue of this experiment, it is shown that only a small quantity of $NCl_3$ is formed during the process of the conversion of cyanuric acid into dichlorocyanuric acid and the formation of $NCl_3$ increases suddenly thereafter during the formation of trichlorocyanuric acid.

EXPERIMENT IV

This experiment was effected to prove that only a small quantity of $NCl_3$ is formed in accordance with the process of this invention and further that it is not necessary to supply the whole quantity of the required alkaline agent in the form of an alkaline earth metal compound which is generally expensive.

In each of several experiments, 1.5 liter of water and 1 mol of cyanuric acid were placed in the vessel used in the preceding experiments and stirred. Mixtures of $Mg(OH)_2$ and NaOH were added thereto, respectively. In each case, the proportion of $Mg(OH)_2$ to NaOH was changed including a case in which no NaOH was used. The reactant liquid was adjusted in temperature so as to maintain it at 10 to 15° C. Gaseous chlorine was introduced into the reactant liquid in the same manner as in Experiment I so as to bring the pH value of the liquid to 3.0, resulting in a yield of trichlorocyanuric acid. In these cases, the proportions of $Mg(OH)_2$ to NaOH used, the formation of $NCl_3$, the yield of trichlorocyanuric acid, and the effective chlorine were as follows:

| Alkaline agent used in mol | | Formation of $NCl_3$, g. | Yield, Percent | Effective Cl, Percent |
|---|---|---|---|---|
| $Mg(OH)_2$ | NaOH | | | |
| 0.2 | 2.6 | 8.92 | 80.3 | 89.98 |
| 0.4 | 2.2 | 3.40 | 85.1 | 89.81 |
| 0.5 | 2.0 | 1.13 | 88.3 | 90.33 |
| 0.7 | 1.6 | 1.10 | 88.6 | 90.52 |
| 0.9 | 1.2 | 1.05 | 88.4 | 89.87 |
| 1.2 | 0.6 | 1.11 | 89.1 | 90.25 |
| 105 | None | 1.10 | 88.5 | 90.01 |

Figure 4:
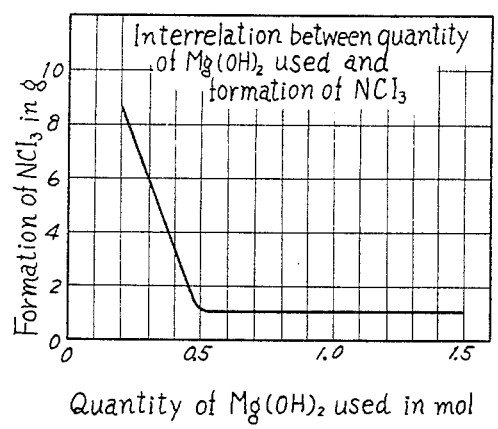
FIG. 4 is a diagrammatic view illustrating the interrelation between the quantity of $Mg(OH)_2$ used and the formation of $NCl_3$ in Experiment IV.

The interrelation of the quantities of $Mg(OH)_2$ used to the quantities of $NCl_3$ formed during the reaction in this exepriment is illustrated in FIG. 4.

From this experiment, it is seen that, in order to obtain a high yield of trichlorocyanuric acid while inhibiting the formation of $NCl_3$, it is sufficient to use 2 mols or less of NaOH and 0.5 mol or more of $Mg(OH)_2$ as the alkaline agent, but it is not necessary to supply the entire quantity of the required alkaline agent in the form of an alkaline earth metal compound as is required in the prior art.

EXPERIMENT V

In this experiment, it was intended to show that there are obtained similar results if $Ca(OH)_2$ was substituted for the $Mg(OH)_2$ in Experiment IV.

In each of several experiments, 1.5 liters of water and 1 mol of cyanuric acid were placed in the vessel of Experiments I-IV and stirred. Mixtures of $Ca(OH)_2$ and NaOH were added thereto, respectively. For each case, the proportion of $Ca(OH)_2$ to NaOH was changed including a case where no NaOH was used. The reactant liquid was adjusted in temperature so as to maintain it at 10 to 15° C. Gaseous chlorine was introduced into the reactant liquid in the same manner as in Experiment I so as to bring the pH value of the liquid to 3.0, resulting in a yield of trichlorocyanuric acid. In these cases, the proportions of $Ca(OH)_2$ to NaOH used, the formation of $NCl_3$, the yield of trichlorocyanuric acid, and the effective chlorine were as follows:

| Alkaline agent used in mol | | Formation of $NCl_3$, g. | Yield, Percent | Effective Cl, Percent |
|---|---|---|---|---|
| $Mg(OH)_2$ | NaOH | | | |
| 0.2 | 2.6 | 8.40 | 79.2 | 89.61 |
| 0.4 | 2.2 | 3.20 | 83.8 | 90.05 |
| 0.5 | 2.0 | 1.17 | 87.4 | 89.88 |
| 0.7 | 1.6 | 1.10 | 87.8 | 90.54 |
| 0.9 | 1.2 | 1.16 | 88.1 | 90.02 |
| 1.2 | 0.6 | 1.13 | 87.5 | 90.16 |
| 1.5 | None | 1.15 | 87.7 | 90.07 |

The interrelation of the quantities of NaOH used to the quantities of $NCl_3$ formed during the reaction in this experiment is illustrated in FIG. 5.

From this experiment, it is seen that the formation of $NCl_3$ becomes suddenly more and the yield of trichlorocyanuric acid is lowered when more than 2 mols of NaOH are used. On the contrary, when less than 2 mols of NaOH are used, a lesser quantity of $NCl_3$ is formed and the yield of trichlorocyanuric acid is higher. Thus it is proven that it is possible to produce trichlorocyanuric acid in excellent yield with safety and with the formation of only a small quantity of $NCl_3$ by virute of the joint use of alkaline agents in accordance with this invention.

It was also found that there are the following disadvantages when the entire required quantity of the alkaline agent is provided by an alkaline earth metal compound.

In general, the alkaline earth metal compounds available for industrial use have poor purity in that there are contained acid-insoluble impurities and iron derived matters such that it is impossible to yield a favorable product when a large quantity of such an industrial alkaline earth metal compound is used as the alkaline agent in the production of trichlorocyanuric acid. For example, industrial $Ca(OH)_2$ is made by burning naturally produced $CaCO_3$ so that it contains acid-insoluble impurities and iron derived matters. $Mg(OH)_2$ is produced by treating a compound with rather impure $Ca(OH)_2$ so that a similar result is obtained as in the case of $Ca(OH)_2$. Thus, using such $Ca(OH)_2$ or $Mg(OH)_2$, the product trichlorocyanuric acid disadvantageously becomes of inferior color, with high contents of impurities, and of low stability.

Therefore, when the required entire quantity of the alkaline agent is provided by an alkaline earth metal compound, and it is desired to produce highly pure trichlorocyanuric acid having superior color, it becomes necessary to use highly pure alkaline earth metal compound. In order to produce such highly pure alkaline earth metal compound as required above, a purification treatment using $NH_4OH$ or NaOH is required so that the produced alkaline earth metal compound becomes four to five times more expensive comparing the industrial material, which can be hardly used in the industrial standpoint.

It is preferable to minimize the quantity of alkaline earth metal compound to be used in the production of trichlorocyanuric acid because there is such a problem in color and impurities as described above when industrial $Ca(OH)_2$ or $Mg(OH)_2$ is used while the use of highly purified matter is economically impossible. In addition, it is troublesome and a cause of error to handle and measure such a solid (or powder) material as an alkaline earth metal compound as compared to such a liquid material as a caustic alkali. Furthermore, there is the drawback that the spent acid treatment becomes complicated in removing precipitates. That is, $Mg(OH)_2$ precipitates by neutralizing the spent acid after the chlorination and $Ca(OH)_2$ precipitates by the action of sodium sulfite used to reduce the effective chlorine in the spent liquid.

It is also a feature of this invention that, when a lesser quantity of the alkaline earth metal compound is used, it is possible to economically produce highly pure trichlorocyanuric acid of excellent color having fewer impurities.

EXPERIMENT VI

In this experiment it is shown that it is possible to produce a highly pure product of trichlorocyanuric acid, while inhibiting the formation of $NCl_3$, even if a relatively inexpensive alkaline agent of merely industrial purity is used, in accordance with this invention, while it is necessary to use a relatively expensive alkaline agent purified up to a reagent grade in order to heighten the color and purity of trichlorocyanuric acid produced in accordance with the prior art where the entire quantity of the alkaline agent is provided by an alkaline earth metal compound for inhibiting the formation of $NCl_3$.

In each of several cases 1.5 liters of water and 1 mol. of cyanuric acid were placed in the reaction vessel used in Experiment I and stirred. Into the reactant, various alkaline agents as follows were added, respectively. These alkaline agents include NaOH, reagent grade $Mg(OH)_2$, reagent grade $Ca(OH)_2$, industrial $Mg(OH)_2$, industrial $Ca(OH)_2$, a mixture consisting of 0.5 mol. of industrial $Mg(OH)_2$ and 2 mols of NaOH in accordance with this invention, and a mixture consisting of 0.5 mol of industrial $Ca(OH)_2$ and 2 mols of NaOH in accordance with this invention. The reactant liquids were adjusted in temperature to 10 to 15° C. and reacted with gaseous chlorine in the same manner as in Experment I until the pH value of the reactant liquid became 3.0, thus yielding trichlorocyanuric acid. The following table is given for comparison in color, purity, and yield of the product, and also in quantity of $NCl_3$ formed with the various alkaline agents.

| Alkaline agent | Trichlorocyanuric acid produced | | | |
|---|---|---|---|---|
| | Whiteness reflection factor, percent | Ash, percent | Yield, percent | NCl₃ formed, g. |
| Jointly used in accordance with this invention: | | | | |
| Industrial Mg(OH)₂ 0.5 mol and NaOH 2 mols | 84 | 0.31 | 88.1 | 1.15 |
| Industrial Ca(OH)₂ 0.5 mol and NaOH 2 mols | 85 | 0.33 | 87.3 | 1.17 |
| NaOH | 89 | 0.18 | 75.3 | 9.61 |
| Reagent grade Mg(OH)₂ | 89 | 0.17 | 88.3 | 1.13 |
| Reagent grade Ca(OH)₂ | 88 | 0.18 | 87.4 | 1.17 |
| Industrial Mg(OH)₂ | 70 | 0.90 | 87.8 | 1.12 |
| Industrial Ca(OH)₂ | 72 | 0.94 | 87.0 | 1.20 |

From this experiment, it is seen that it is possible according to the invention to economically produce highly pure trichlorocyanuric acid with superior color with safety and with less formation of $NCl_3$ even if an alkaline earth metal compound of industrial purity.

This invention has been derived from the above-mentioned experimental facts clarified by us. In accordance with this invention, an alkaline agent consisting of up to twice the molar amount of either a hydroxide or a carbonate of an alkali metal and 0.5 times the molar amount of the hydroxides, oxides, or carbonates of an alkaline earth metal or Zn is used per mol of cyanuric acid so as to prepare reactant liquid into which gaseous chlorine is passed at a temperature (of the liquid) of from the freezing point to 40° C. until the pH value of the liquid becomes less than 4.0 so as to precipitate trichlorocyanuric acid which is then separated from the reactant liquid by means of filtration, centrifugal separation, or the like, whereby trichlorocyanuric acid is produced. By virtue of this invention, it is possible not only to inhibit the formation of dangerous $NCl_3$ to less than about 1.3 g. per mol of the starting material cyanuric acid so as to avoid a dangerous explosion of the $NCl_3$ whereby the operation becomes extremely safe, but also to enhance the yield of the product trichlorocyanuric acid up to 85 to 90% based on the quantity of the cyanuric acid while corresponding yield in accordnace with the well known standardized process is 75%.

The following examples illustrate methods of carrying this invention into effect.

Example I 1.5 liters of water were placed in the reaction vessel described in Experiment I and 1 mol of cyanuric acid and 2 mols of NaOH were dissolved therein so as to prepare a reactant liquid which was then adjusted in temperature to 10 to 15° C. Gaseous chlorine was introduced into the reactant liquid in the same manner as set forth in Experiment I until the pH of the reactant liquid became 3.0. Then 0.5 mol of $Ca(OH)_2$ was added to the reaction system and after the addition, the introduction of chlorine was continued until the pH value became 3.0. The produced trichlorocyanuric acid was treated in the same manner as set forth in Experiment I, yielding 202 g. of trichlorocyanuric acid, and corresponded to a yield of 87% based on the starting cyanuric acid, while the formation of $NCl_3$ was 1.28 g., an extremely small quantity.

Example II

In the example this invention was carried into effect with an alkaline agent consisting of $Na_2CO_3$ and MgO.

In the reaction vessel set forth in Experiment I, 1.5 liters of water, 1 mol of $Na_2CO_3$, and 0.5 mol of MgO powder were placed and stirred into a slurry. Adjusting the temperature of the slurry to 10 to 15° C., chlorination was carried out until the pH value became 3.0. The produced trichlorocyanuric acid was treated in the same manner as set forth in Experiment I, yielding 209 g. of trichlorocyanuric acid having 90.25% of effective chlorine. The yield corresponds to 90.0% of the starting cyanuric acid, while the formation of $NCl_3$ was 1.21 g.

Example III

In this example KOH was used jointly with $BaCO_3$, as a carbonate of an alkaline earth metal.

Except for the substitution of the starting materials consisting of 1.5 liters of water, 2 mols of KOH, 0.5 mol of powdered $BaCO_3$ and 1 mol of cyanuric acid, this example is similar to Example II, yielding 205 g. of the product trichlorocyanuric acid, which corresponds to 88.2% based on the cyanuric acid while the formation $NCl_3$ was 1.05 g.

Example IV

In this example, as the alkaline agent, NaOH and ZnO were jointly used.

Except for the substitution of the starting materials consisting of 1.5 liters of water, 2 mols of NaOH, 0.5 mol of powdered ZnO and 1 mol of cyanuric acid, this example is similar to Examples II and III, yielding 209 g. of the product corresponding to 90.0% based on cyanuric acid and forming 1.13 g. of $NCl_3$.

This example shows that a Zn compound may be used in the production of trichlorocyanuric acid with excellent yield, restraining the formation of $NCl_3$, to the same effect as the alkaline earth metal compound.

Example V

This example was effected in a pilot plant. A stirrer equipped 100 liter stainless vessel was used as the slurry tank and a 100 liter jacketed glass-lined vessel provided with a stirrer, a thermometer, a gas inlet, a gas outlet, a pH meter, a slurry inlet, and a product outlet was used as the reaction vessel. It was provided for the passage of brine through the jacket at a temperature of −10 to 15° C. for cooling the reactant slurry suitably.

In the slurry tank, 43 kg. of water, 3 kg. of cyanuric acid, 3.84 kg. of aqueous NaOH solution having a concentration of 48.5% by weight, and 0.74 kg. of $Mg(OH)_2$ having a purity of 91.3% were placed and stirred into a slurry. The slurry was then transferred into the 100 liter glass-lined reaction vessel, the temperature of the slurry being adjusted to 10 to 15° C. by means of brine passing through the jacket at a temperature of −10 to 15° C. while stirring the slurry. The reactant slurry was then chlorinated by passing gaseous chlorine through the slurry at a rate of 25 liters per minute until the pH value of the slurry became 3.0 whereupon the introduction of chlorine was stopped. The produced trichlorocyanuric acid in slurry form was introduced to a centrifugal separator through the product outlet, dried, washed with water, and dried, yielding trichlorocyanuric acid product. The formation of $NCl_3$ was measured by the same procedures as set forth in Experiment I. The yield was 4.81 kg. corresponding to 89.0%, and having 89.6% of effective chlorine. The formation of $NCl_3$ was 1.16 g. per mol of cyanuric acid.

Example VI

In this example, $Ca(OH)_2$ was substituted for the $Mg(OH)_2$ in the Example V.

43 kg. of water, 3 kg. of cyanuric acid, 3.84 kg. of aqueous NaOH solution having a concentration of 48.5% by weight, and 0.89 kg. of Ca(OH)$_2$ having a purity of 96.8% were placed in slurry tank of Example V and stirred so as to form a slurry which was then treated as in Example V to produce trichlorocyanuric acid. The yield was 4.72 kg. and 87.3%. 1.18 g. of NCl$_3$ was formed per mol of cyanuric acid.

By virtue of Examples V and VI, the practicality of the process in accordance with this invention was proved.

Example VII

The datum of this example was obtained by carrying out the process in an industrial plant. A 2 m.$^3$ slurry tank provided with a stirrer and a slurry pump and a 2 m.$^3$ jacketed glass-lined reaction vessel provided with a stirrer, a thermometer, a gas inlet, a gas outlet, a pH meter, a slurry inlet, and a product outlet were used. The jacket was adapted to pass brine at a temperature of −10 to 15° C. therethrough.

At first, 850 kg. of water, 60 kg. of cyanuric acid, 76.7 kg. of aqueous NaOH solution having a concentration of 48.5% by weight, and 14.9 kg. of Mg(OH)$_2$ having a purity of 91.3% were placed in the slurry tank and stirred so as to prepare a slurry which was transferred into the reaction vessel by means of the slurry pump. The slurry was adjusted to a temperature of 10 to 15° C. by passing brine at a temperature of −10 to 15° C. through the jacket of the reaction vessel, and then chlorinated by passing gaseous chlorine into the slurry at the rate of 500 liters per minute until the pH value of the slurry became 3.0 whereupon the chlorination was stopped. Trichlorocyanuric acid thus produced in the form of a slurry was sent into a centrifugal separator through the product outlet, where the product was dried. It was then washed with water and dried. The yield of trichlorocyanuric acid was 95.2 kg. corresponding to 88.1% and containing 89.82% of effective chlorine. There was formed 0.97 kg. of NCl$_3$ per mol of cyanuric acid.

Example VIII

In this example, Ca(OH)$_2$ was substituted for the Mg(OH)$_2$ used in Example VII. Other than the above substitution the same plant and the same procedures were used.

The slurry tank was charged with 850 kg. of water, 60 kg. of cyanuric acid, 76.7 kg. of aqueous NaOH solution having a concentration of 48.5% by weight, and 17.8 kg. of Ca(OH)$_2$ having a purity of 96.8. A slurry was prepared therein by stirring these materials which was then treated as in Example VII. The yield of trichlorocyanuric acid was 94.3 kg. corresponding to 87.2% and containing 89.33% of effective chlorine. The NCl$_3$ formed amounted to 1.04 g. per mol of cyanuric acid.

By virtue of Examples VII and VIII, it was proved that the process in accordance with this invention is quite safely operable with a high yield, restraining the formation of NCl$_3$ within a small quantity, even when a commercial scale plant is used.

While particular embodiments of this invention have been described, modifications thereof will readily occur to those skilled in the art. It should be understood therefore that the invention is not limited to the particular examples disclosed but that the appended claims are intended to cover all modifications which do not depart from the true spirit and scope of the invention.

The embodiments of the invention in which an exclusive property or privilage is claimed are defined as follows:

1. A process for producing trichlorocyanuric acid, said process comprising chlorinating cyanuric acid with gaseous chlorine in an aqueous medium in the presence of first and second alkaline agents, said first alkaline agent being at least one member of the group consisting of alkali metal hydroxides and alkali metal carbonates and said second alkaline agent being at least one member of the group consisting of alkaline earth metal and zinc hydroxides, carbonates and oxides, said first and second alkaline agents being present in respective amounts of at most 2 mols and at least 0.5 mole per mole of cyanuric acid; at a temperature between the freezing point of said aqueous medium and 40° C. until the aqueous medium has a pH of at most 4.0.

2. A process as claimed in claim 1 wherein an aqueous medium constituted of a slurry or solution of cyanuric acid and the first and second alkaline agents is preliminarily prepared and gaseous chlorine is passed through said aqueous medium.

3. A process as claimed in claim 1 wherein an aqueous medium constituted of a slurry or solution of cyanuric acid and the first alkaline agent is preliminarily prepared, gaeous chlorine is passed through said aqueous medium to effect partial chlorination of the cyanuric acid, the chlorination is interrupted and the second alkaline agent is added and then chlorination is resumed.

4. A process as claimed in claim 3 wherein the aqueous medium is a slurry.

5. A process as claimed in claim 1 wherein chlorinating is initially effected only in the presence of the first alkaline agent and the second alkaline agent is added to the aqueous medium only after a part of the first alkaline agent is consumed.

6. A process as claimed in claim 1 wherein the alkali metal is sodium or potassium and the alkaline earth metal is barium, calcium or magnesium.

References Cited

UNITED STATES PATENTS

| | | | |
|---|---|---|---|
| 2,913,460 | 11/1959 | Brown et al. | 260—248 |
| 2,969,360 | 1/1961 | Westfall | 260—248 |
| 3,336,228 | 8/1967 | Fuchs et al. | 260—248 XR |
| 3,397,203 | 8/1968 | Symes et al. | 260—248 |
| 3,397,206 | 8/1968 | Nicolaisen | 260—248 |

HENRY R. JILES, Primary Examiner

J. M. FORD, Assistant Examiner